United States Patent [19]
Dvorak

[11] Patent Number: 6,099,915
[45] Date of Patent: Aug. 8, 2000

[54] METHOD OF COATING MATERIALS

[75] Inventor: Michael Dvorak, Allmendingen, Switzerland

[73] Assignee: Castolin S.A., Switzerland

[21] Appl. No.: 09/215,824

[22] Filed: Dec. 18, 1998

[30] Foreign Application Priority Data

Dec. 23, 1997 [DE] Germany .............. 197 57 568

[51] Int. Cl.$^7$ .............................. C23C 4/06
[52] U.S. Cl. .............. 427/451; 427/190; 427/191; 427/203; 427/204; 427/205; 427/287; 427/399; 427/405; 427/419.2; 427/450; 427/452; 427/454; 427/456; 427/576; 427/577; 427/578; 427/579; 427/580
[58] Field of Search .............. 427/450, 451, 427/452, 454, 456, 576, 577, 578, 579, 580, 190, 191, 203, 204, 205, 287, 399, 405, 419.2

*Primary Examiner*—Bernard Pianalto
*Attorney, Agent, or Firm*—Bachman & LaPointe, P.C.

[57] ABSTRACT

In a method of coating easily oxidisable materials by plasma powder build-up welding of additive materials in powder form using alternating current or direct current with superimposed alternating current to produce a plasma transferred arc for powder build-up welding in accordance with patent application No 196 26 941.5 a CuNi-alloy is used as an additive welding material with additions (in % by weight) of:

| | |
|---|---|
| Fe | below about 10; |
| Cr | below about 5; |
| B | below about 4; |
| Si | below about 4; |
| C | with about 1.5; | with a degree of mixing of more than 40% by volume.

8 Claims, 1 Drawing Sheet

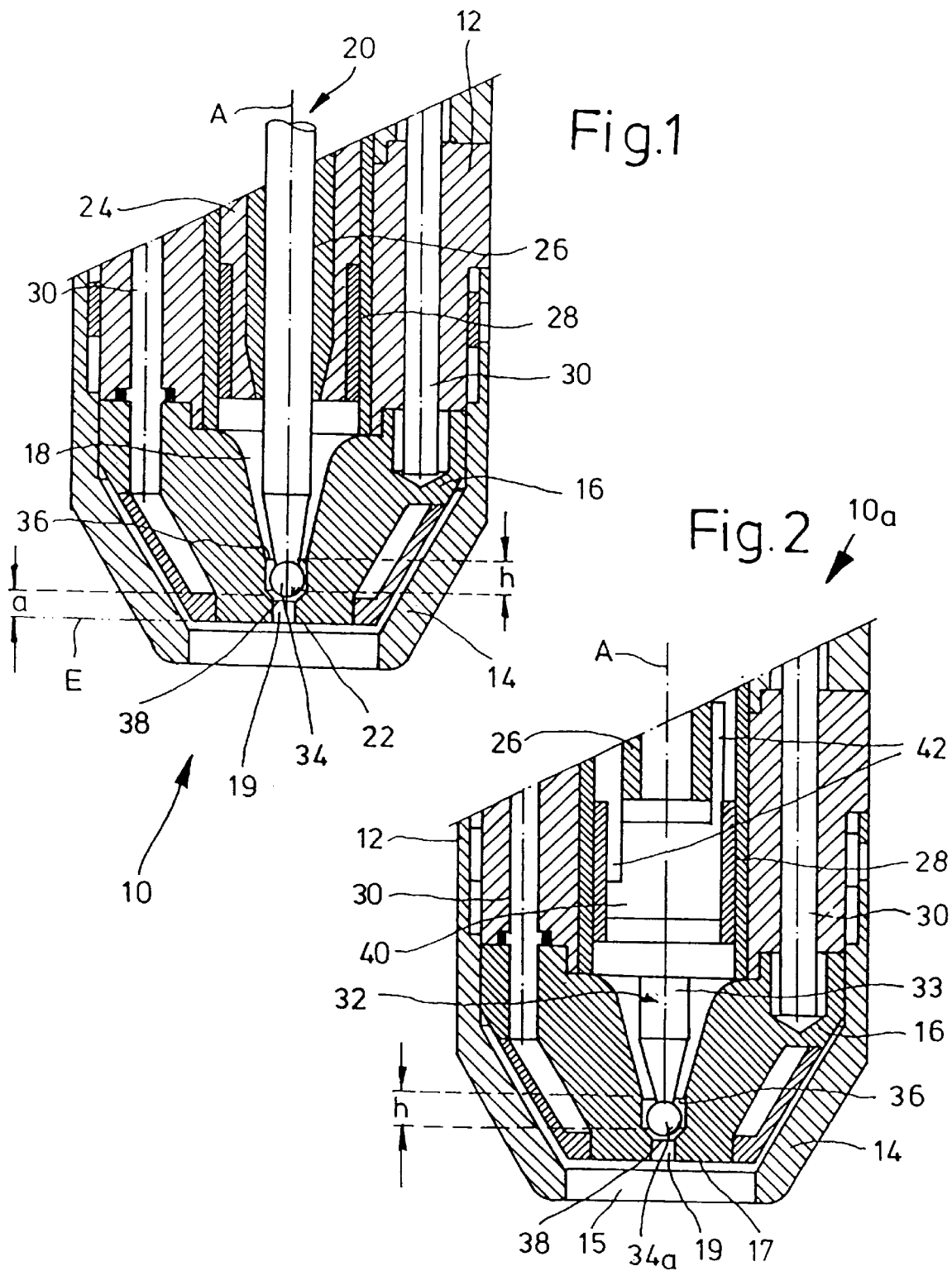

ical scale.

METHOD OF COATING MATERIALS

BACKGROUND OF THE INVENTION

The invention concerns a method of coating materials by plasma powder build-up welding.

The operation of coating iron-based materials with materials in powder form on a nickel, cobalt and/or copper basis has long been implemented in industry. When applying materials which oxidize easily such as for example aluminum, titanium or alloys thereof, the coating operation is very severely disturbed and possibly rendered entirely impossible to implement, due to the oxides which are formed at the surface.

Even attempts to conduct those operations under a protective gas failed. The only possible way of implementing such a coating operation is the very expensive and complicated procedure of operating under vacuum, which has never resulted in use on a large technical scale.

In accordance with German Patent Publication 05 196 26 941, to attain the object of permitting the coating of materials which oxidize easily—in particular light metals or alloys—in a simple and inexpensive manner, the inventor proposed the application to an aluminum alloy of a coating with an additive material in powder form by means of powder build-up welding with a plasma transferred arc (referred to as PTA), by the use of an alternating current or a direct current with a superimposed alternating current; by virtue of that procedure, the oxide skin which is formed due to the oxygen in the air or the residual oxygen in the protective gas, at the surface of the base material or of the additive material in powder form, is destroyed or broken up. That makes it possible to carry out coating operations even on or with those easily oxidizable materials, and to achieve a good weld quality. An alternating current in a frequency range of between 10 and 100 Hz is preferred in that procedure. When operating with a direct current as the energy carrier, then—in order to achieve the same properties in terms of welding procedure—it is necessary to associate with the direct current an alternating current at a frequency of between about 10 and 1000 Hz or in the frequency range of between about 1 and 200 KHz.

It is also proposed that the endeavor be made to achieve a high degree of mixing with the base material and it is further proposed that in accordance with the invention the flow speed of the issuing gases be so selected that the slags or oxides which are formed by virtue of the residual oxygen are torn by the gas flow and deposited at the edge of the molten bath.

Also in accordance with the previous invention is a plasma torch with a gas duct of a burner nozzle, the gas duct being arranged upstream of a nozzle opening of narrower cross-section, and with a bar-type cathode which is rounded at its end and in particular is of a spherical configuration, for operation with a superimposed alternating current, for transfer of the plasma; that cathode end forms the base point of the plasma arc which is produced. In other respects attention is directed to the content of the reference and the particular configuration of the cathode; that spherical cathode end forms the base point of the plasma arc which is formed.

A plasma torch for a transferred arc of the kind set forth in the opening part of this specification, with a round bar electrode—disposed upstream of a chamber arranged upstream of the nozzle opening—, with the electrode having a free end which is bevelled therearound, are admittedly known from EP-A-0 452 494. There is however no reference therein to the structure discussed.

In the plasma torch of the previous invention the bulging shaping of the cathode can be so arranged that it touches a plane determined by the end face of an anode surrounding the cathode, or projects outwardly beyond that plane by a short distance, about at most between 3 and 4 mm.

A preferred arrangement has a cathode which is set back into the gas duct of the torch nozzle and whose spherical configuration is then at a short spacing—also of at most 4 mm—relative to that plane and at a gap spacing relative to a shoulder step which forms a transition between the gas duct and the following nozzle opening of narrower cross-section. That ring-like shoulder step is adjoined by a cylindrical portion of the gas duct as a receiving means for the shaped configuration of the cathode and with same and the shoulder step defines the passage for the gas to pass therethrough.

It has proven to be desirable for the cathode which is supplied with an alternating current or with a direct current with superimposed alternating current to be equipped with water cooling. The cathode can be for example in the form of a water-cooled support body with interchangeably fitted cathode portion—of material with a high melting point and with a low level of thermal conductivity—for the shaped configuration or for the base point of the arc; the support body is advantageously formed from copper or a copper alloy.

SUMMARY OF THE INVENTION

In consideration of those factors the inventor now set himself the object of affording a supplemental method of producing hard platings by means of plasma powder build-up welding (PTA).

That object is attained by the teaching of the present invention.

The method according to the invention is a synergy of method modifications—use of alternating and/or pulse current, chemical composition of the additive welding material—CuNi-alloy in a preferred ratio of about 70:30—with additions of Fe(<10% by weight), Cr (<5% by weight), B (<3% by weight), Si (<3% by weight) and C (<1.5% by weight) and setting of the method parameters with a degree of mixing of >40% by volume, which is atypically high in terms of methodology.

The chemical composition of the additive material must be adapted in accordance with the respective Al-alloy to be coated and the desired degree of hardness—between 200 and 800 Vickers. In addition, alloying elements other than those referred to hereinbefore may possibly be used, such as Mo, Mn, Co, Ti, Ta, Zr, Mg in amounts <10% by weight and P, N<2% by weight. It is also possible to envisage mixing in oxidic, carbidic or other hard substances (nitrides, silicides) for a further increase in wear resistance.

The chemical composition of the metallic matrix in the resulting hard application—disregarding hard substance inclusions—is in accordance with the invention as follows:

| Al | Cu | Ni | Fe | Cr | Si | B | others |
|---|---|---|---|---|---|---|---|
| 30–70 | 42–21 | 18–9 | 6–2 | 4–0.5 | 1.8–0.5 | <2 | <10 wt % |

An anti-wear layer produced in accordance with the forgoing features is also in accordance with the invention.

BRIEF DESCRIPTION OF THE DRAWINGS

Further advantages, features and details of the invention will be apparent from the description hereinafter of preferred embodiments and with reference to the drawing; the drawing shows views in partial longitudinal section through the head of a torch nozzle for coating or welding easily oxidizable additive substances in powder form. In the drawing:

FIGS. 1 and 2 each show a pin cathode with three-dimensionally formed base point for a plasma arc.

DETAILED DESCRIPTION OF PREFERRED EMBODIMENTS

On a torch nozzle 10, fitted on to a nozzle body 12 is a protective gas cap 14 which extends around an anode 16. Extending on the longitudinal axis A of the torch nozzle 10 in FIG. 1 is a bar-shaped cathode 20 which passes through an axial gas duct 18 in the anode 16. The cathode 20 terminates with a shaped portion 34 thereon, at a plane E in the proximity of a passage 15 in the protective gas cap 14, the plane E being defined by the mouth opening 22 of the gas duct 18 or by the end face 17—FIG. 2—of the anode 16. The shaped portion 34 is disposed at a cylindrical nozzle opening 19 of the gas duct 18 at a spacing a of about 3 mm relative to the plane E defined by the mouth opening of the gas duct, in a cylindrical portion 36 of a height h of the gas duct 18 and at a gap spacing relative to an inclined shoulder ring 38. At the latter, the cylindrical portion 36 of the gas duct 18 which tapers outside of the latter forms the transition into the cylindrical nozzle opening 19 which is of smaller diameter in relation to the cylindrical portion 36.

Associated with the cathode 20 are contact portions 26 which are provided within a cylindrical clamping device 24 and which rest with their clamping device 24 in an insulation 28. The latter is in turn disposed in the nozzle body 12. Water coolant ducts 30 which extend parallel to the axis are to be seen in the nozzle body 12, at a spacing relative to the insulation 28.

In the configuration of a torch nozzle 10 as shown in FIG. 2 the cathode 32 thereof includes a cathode portion in the form of a short pin-type cathode 33 of material with a high melting point and with a low level of thermal conductivity for the rounded shaped portion $34_a$. The cathode portion 33 is axially screwed to a support body 40 of copper. The latter is connected to a water coolant arrangement 42.

Not shown is an embodiment in which the shaped portion 34 projects beyond the end face 17 or the plane E by a dimension of up to 4 mm, preferably up to 3 mm.

When a current is applied, during the plasma powder build-up welding procedure, the shaped portion 34, $34_a$ becomes the base point of the plasma arc produced. The pin cathode 32, $32_a$ which is formed for example from tungsten or a tungsten alloy is operated with an alternating current in a frequency range of between 10 and 100 Hz.

What is claimed is:

1. A method which comprises: coating an easily oxidizable base material by plasma powder build-up welding of additive materials in powder form using one of alternating current and direct current with superimposed alternating current, to produce a plasma transferred arc for powder build-up welding, including the steps of employing a CuNi-alloy as an additive welding material with additions (in percent by weight) of:

| | |
|---|---|
| Fe | below about 10, |
| Cr | below about 5, |
| B | below about 4, |
| Si | below about 4, |
| C | with about 1.5, | and providing a degree of mixing with the base material of more than 40% by volume.

2. A method as set forth in claim 1, including the step of providing a metallic matrix base material with additions (in percent by weight):

| | |
|---|---|
| Al | between 30 and 70, |
| Cr | between 42 and 21, |
| Ni | between 18 and 9, |
| Fe | between 6 and 2, |
| Cr | between 4 and 0.5, |
| Si | between 1.8 and 0.5, |
| B | below 2, |
| others: | below 10. |

3. A method as set forth in claim 1, including the step of providing a ratio of Cu and Ni of about 70:30.

4. A method as set forth in claim 1, including the step of mixing in the additive welding material oxidic, carbidic or the like hard substances.

5. A method which comprises: coating an easily oxidizable base material by plasma powder build-up welding of additive materials in powder form using one of alternating current and direct current with superimposed alternating current, to produce a plasma transferred arc for powder build-up welding, including the step of employing a CuNi-alloy as an additive welding material with additions (in percent by weight) of Mo, Mn, Co, Ti, Ta, Zr, Mg in amounts below about 10 and P, N in amounts below about 2.

6. A method as set forth in claim 5, including the step of providing a metallic matrix base material with additions (in percent by weight):

| | |
|---|---|
| Al | between 30 and 70, |
| Cr | between 42 and 21, |
| Ni | between 18 and 9, |
| Fe | between 6 and 2, |
| Cr | between 4 and 0.5, |

-continued

| | |
|---|---|
| Si | between 1.8 and 0.5, |
| B | below 2, |
| others: | below 10. |

7. A method as set forth in claim 5, including the step of providing a ratio of Cu and Ni of about 70:30.

8. A method as set forth in claim 5, including the step of mixing in the additive welding material oxidic, carbidic or the like hard substances.

\* \* \* \* \*